UNITED STATES PATENT OFFICE.

RICHARD K. LE BLOND AND WILLIAM F. GROENE, OF CINCINNATI, OHIO, ASSIGNORS TO THE R. K. LE BLOND MACHINE TOOL COMPANY, OF CINCINNATI, OHIO, A CORPORATION OF OHIO.

CONTROLLING MEANS FOR MOTOR-DRIVEN MACHINES.

1,126,235.  Specification of Letters Patent.  Patented Jan. 26, 1915.

Application filed January 24, 1913. Serial No. 743,917.

*To all whom it may concern:*

Be it known that we, RICHARD K. LE BLOND and WILLIAM F. GROENE, citizens of the United States of America, and residents of Cincinnati, county of Hamilton and State of Ohio, have invented certain new and useful Improvements in Controlling Means for Motor-Driven Machines, of which the following is a specification.

This invention relates to new and improved means for controlling motor driven machines, and particularly motor driven lathes and similar machines.

An object of this invention is to produce new and improved means for stopping and starting a motor driven lathe or similar machine without the necessity of stopping the driving motor or of varying the speed.

A further object is to produce a motor driven lathe or similar machine, provided with improved means for operatively disconnecting the driving motor from the main spindle of the machine and for rendering a retarding or brake mechanism operative, for the purpose of quickly stopping the spindle.

A further object is to produce a new and improved controlling mechanism for motor driven lathes which is more effective, and safer in operation, than other similar mechanisms known to us.

These and other objects we attain in an apparatus embodying the features herein described, and illustrated in the accompanying drawings, throughout the separate figures of which corresponding numerals are employed to indicate like parts.

Figure 1:
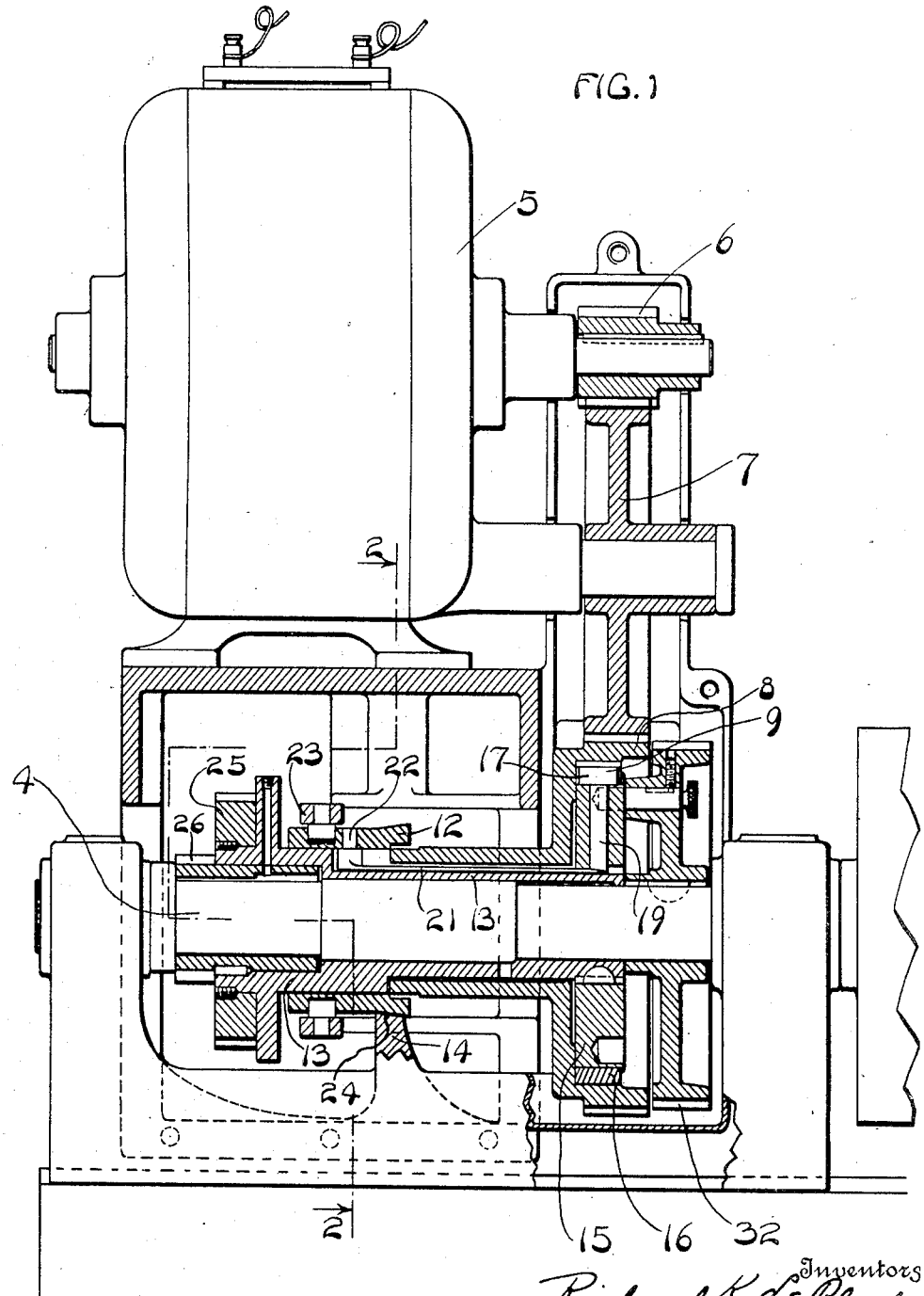
Figure 2:
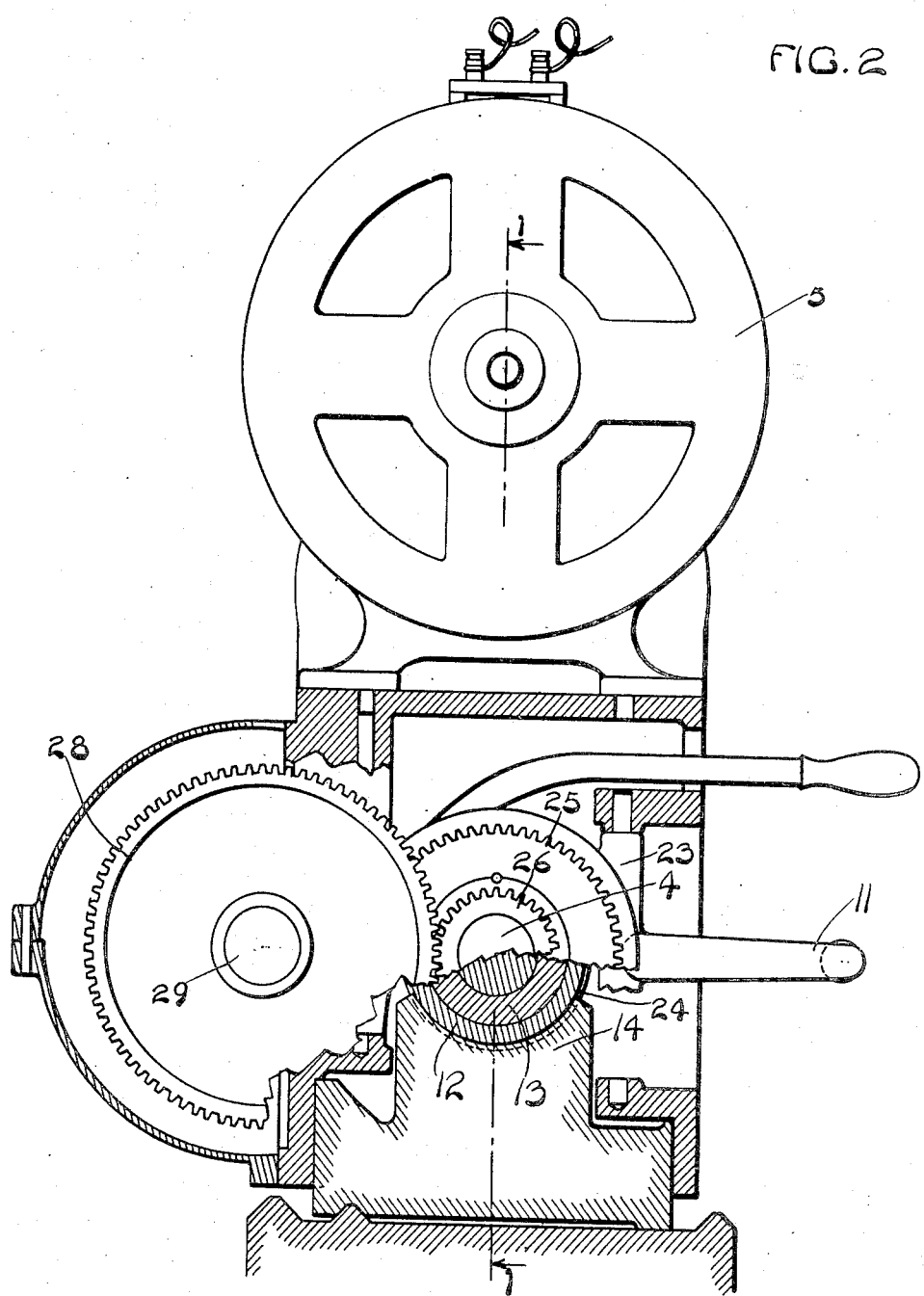
Figure 3:
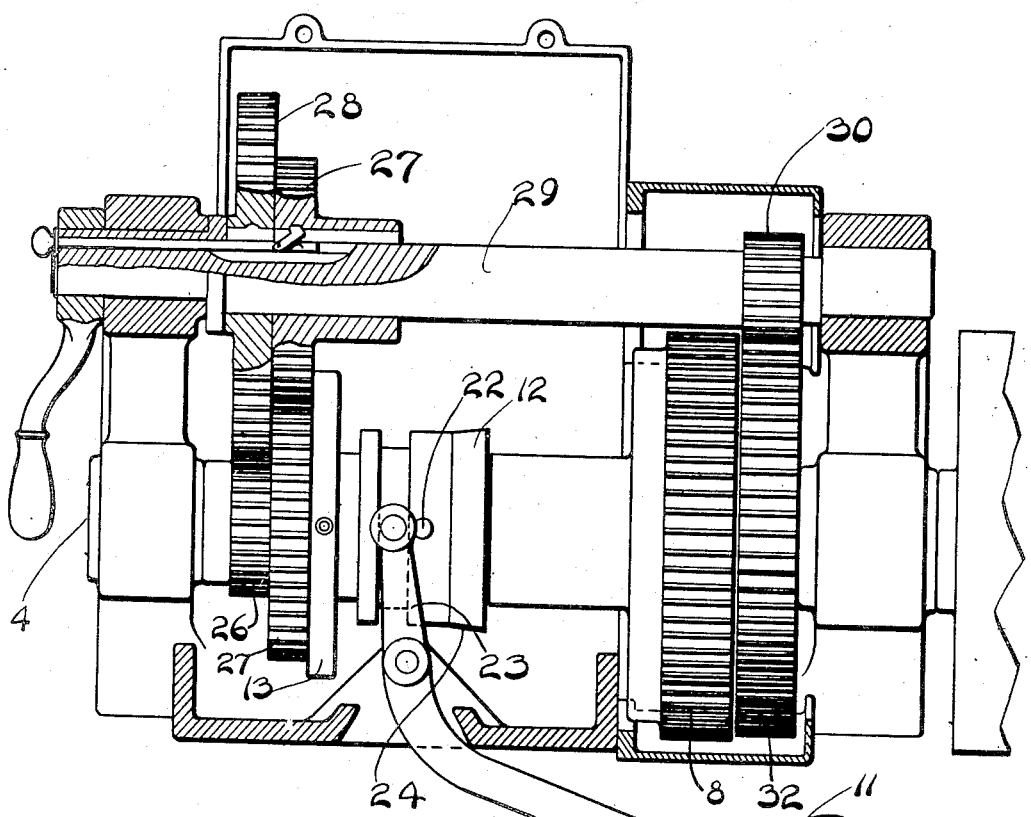

Figure 1 is a partial elevation and partial sectional view along the line 1—1 of Fig. 2, and illustrates an embodiment of the invention as applied to the mechanism of the head-stock of a lathe. Fig. 2 is a partial elevation and a partial sectional view along the line 2—2 of Fig. 1. Fig. 3 is a plan view of a portion of the apparatus shown in Figs. 1 and 2, the motor and several power transmission gears being omitted for the sake of clearness.

In the drawings, we have shown an embodiment of our invention in connection with, and forming a part of, the operating mechanism of the head-stock of the lathe, but it will be understood that we do not limit the application of the invention to such machines.

The main spindle 4 of the lathe is actuated by an electrically or otherwise impelled motor 5 which is operatively connected to the spindle by means of a pinion 6, a gear 7 which continually meshes with the pinion, a gear 8 which continually meshes with the gear 7, and a clutch mechanism 9 which is adapted to operatively connect the gear 8 to the transmission mechanism of the head-stock of the lathe. The clutch mechanism 9 is controlled by a hand-lever 11, which is so arranged that when it is moved to disconnect the gear 8 from the transmission mechanism of the head-stock it actuates a movable collar 12, which is splined onto a sleeve 13, forming a part of the transmission mechanism, and moves it into contact with a stationary brake-shoe 14 and stops the spindle 4. The shoe 14 is so located on the frame portion of the machine that it is engaged by the collar 12 and retards rotary motion of the collar after the handle 11 has rendered the clutch mechanism inoperative, or in other words, the handle sets the brake mechanism and stops the spindle 4 after it has operatively disconnected the gear 8 from the sleeve 13.

The pinion 6 is shown rigidly mounted on the shaft of the motor 5 and the gear 7 is shown loosely mounted on an overhanging shaft which may be mounted in any convenient position on the frame portion of the machine, or, as shown, on the inclosing casing of the motor. The gear 8 is provided with an overhanging rim portion, which is located wholly on one side of the web portion of the gear so that it forms a cup-shaped recess, in which a disk 15, rigidly mounted on the sleeve 13, is located. The gear 8 is also provided with a sleeve-shaped hub and is loosely mounted on the sleeve 13. The clutch mechanism 9, as illustrated, consists of an expansible band 16, located between the peripheral face of the disk 15 and the inner peripheral face of the rim portion of the gear 8 and is adapted to be expanded into gripping contact with the inner peripheral face of the rim portion of the gear 8 by means of a T-shaped plunger 17, which is carried by the disk 15. The plunger 17 is provided with a wedge-shaped head, which is located between the ends of the bands 16, and it is also provided with a shank 19, which is slidably mounted in a radially extending aperture, formed in the disk, and is capable of being moved longitudinally along the aperture by the handle 11, for the purpose of varying the relative positions of the ends of the band 16 and of thereby moving the band into gripping engagement with the gear 8 or permitting it to move inwardly in response to its resiliency and to thereby disengage the gear 8. The inner end of the shank of the plunger is beveled and seats on a finger 21, which is mounted in a longitudinally extending groove, formed in the sleeve 13, and is capable of being moved longitudinally along the groove. The end of the finger against which the plunger rests is beveled, so that it is capable of moving the plunger outwardly, with reference to the disk 15, when it is moved in one direction along its mounting groove, and of permitting the plunger to be moved inwardly, by the resiliency of the band 16, when it is moved in the other direction.

The finger 21 is actuated by the handle 11 through the agency of the shiftable collar 12 which, as has been said, is splined onto the sleeve 13 and is capable of moving along it. The finger 21 is provided with a laterally projecting lug 22 which projects into a suitable aperture, provided for its reception in collar 12 and the shoe is provided with an annular groove, in which a yoke 23 is rotatively mounted. The yoke 23 is pivotally connected to the bifurcated end of the lever 11. The collar 12 is provided near one end with a beveled or conical face, which is adapted to be moved into engagement with a similarly inclined face 24 provided on the stationary brake-shoe 14, when the collar is shifted along the sleeve 13, for the purpose of disengaging the band 16 from gripping or clutching engagement with the gear 18. The brake-shoe 14, as illustrated in Fig. 2, is so formed that its gripping face 24 is arc-shaped and is concentric with the collar 12 or the sleeve 13. The sleeve 13 is rotatively mounted on the spindle 4 and is provided with two gears 25 and 26, which are rigidly mounted on it and which form a part of the transmission or change speed mechanism of the head-stock of the lathe. The gears 25 and 26 respectively mesh with back gears 27 and 28 which are mounted on a back shaft 29. The shaft 29 is provided with a pinion 30, which meshes with a gear 32, rigidly mounted on the spindle 4.

Any ordinary means may be employed for rendering either of the gears 27 or 28 operative in driving the back shaft 29 and the back shaft may be provided with any suitable means for moving it laterally or eccentrically so as to move the pinion 30 out of mesh with the gear 32.

The operation of the apparatus is briefly as follows: The motor 5 runs at a substantially constant speed and drives the continually meshing gears 6, 7 and 8. When it is desired to actuate or drive the spindle, the handle 11 is pulled outwardly, or in the direction indicated by the arrow shown in Fig. 3 so that it moves the collar 12 along the sleeve 13, in the direction indicated by the arrow shown in Fig. 3, and thereby moves the finger 21 so as to force its beveled end into engagement with the inner and beveled end of the shank of the plunger 17. This moves the plunger outwardly, with reference to the disk 15, so that its head spreads the ends of the resilient band 16 apart and moves the band into clutching engagement with the inner peripheral face of the rim of the gear 8 and thereby operatively connects the gear 8 to the disk 15. This causes the gear 8 to drive the disk and consequently the sleeve 13, upon which the disk is rigidly mounted. The rotary motion of the sleeve is imparted to the back shaft, in the usual manner, and, from the back shaft to the spindle 4, by means of the pinion 30 and gear 32. When it is desired to stop the spindle 4 the handle 11 is pushed inwardly, or in a direction opposite to that indicated by the arrow, in Fig. 3, and the collar 12 is thereby moved along the sleeve 13 and is forced into engagement with the face 24 of the stationary brake shoe 14. This motion of the collar 12 retracts the finger 21 so that its beveled end permits the plunger 17 to move inwardly toward the center of the disk 15 and this permits the band 16 to contract and move out of gripping or clutching engagement with the rim portion of the gear 8. As soon as the band 16 is disengaged from the gear 8, the gear rotates loosely on the sleeve 13, and ceases to drive the spindle. The friction between the conical face of the collar 12 and the friction face 24 of the brake-shoe 14 checks and finally stops the rotary motion of the sleeve 13 and consequently stops the spindle 4. In addition to this, the brake is effective in preventing the sleeve 13 from turning as long as the finger 21 is in the retracted position; or, in other words, by employing the single hand lever for the clutch mechanism and the brake, the brake is effective as long as the clutch mechanism is inoperative as a driving element of the lathe. This arrangement is advantageous since it eliminates the danger of the lathe being accidently started and also prevents it from running continually, while the motor is operating, due to the slight frictional engagement which may exist between the hub portion of the gear 8 and the sleeve 13. An additional feature of advantage obtained by this construction is that the motor 5 can operate continuously and at a predetermined speed, while the lathe is being operated intermittently and at different speeds, and it is not necessary to start and stop the motor each time the lathe is stopped and started. This is advantageous because it is not necessary for the motor to be brought up to speed each time the lathe is started, since it continually operates at normal speed. In addition to this, all the transmission gears are continually in mesh, with the exception of the pinion 30 and the gear 32, and consequently the danger of stripping the gears is almost wholly overcome.

When it is desired to drive the spindle 4, at its maximum speed, the pinion 30 is moved out of mesh with the gear 32 and that gear is positively locked to the disk 15, by means of one or more pins 28, which are adapted to be secured in place in suitable apertures provided in the gear 32, and which are adapted to engage correspondingly located recesses formed in the disk 15. When the disk 15 and the gear 32 are locked together in this manner, the spindle 4 is driven directly by the motor through the pinion 6, the gear 7, the gear 8, the disk 15 and the gear 32, it being understood that the handle 11 is moved outwardly so that the clutch mechanism 9 is effective in operatively connecting the gear 8 and the disk 15.

It is obvious that many variations and changes in the details of construction will readily suggest themselves to persons skilled in the art, and that many of the features shown and described may be omitted or used either alone or in association with others not described; without departing from the spirit and scope of our invention as set forth by the appended claims.

What we claim is:

1. In a motor driven machine of the character described, the combination of a driven shaft, a motor driven pinion, a gear rotatively mounted on the driven shaft, a continuously meshing gear between said pinion and said rotatively mounted gear, means for operatively connecting the rotatively mounted gear to the driven shaft, a brake shoe and shiftable means for actuating said first mentioned means to operatively connect the rotatively mounted gear and the shaft when moved in one direction and to operatively disconnect the gear and the shaft and to engage the brake shoe when moved in the other direction.

2. In a motor driven lathe, a spindle, driving means for the spindle actuated by the motor and rotatively mounted with relation to the spindle, a clutch mechanism mounted on the spindle for operatively connecting said means to the spindle, a brake mechanism for the spindle and means shiftable longitudinally along the spindle for actuating said brake mechanism and said clutch mechanism.

3. In combination in a lathe, a driven spindle, a motor for driving said spindle, a sleeve rotatively mounted on the spindle, gears for operatively connecting the sleeve to the spindle, a gear loosely mounted on the sleeve, a continuously meshing gear train driven by the motor and including said gear, a clutch mechanism mounted on the sleeve for operatively connecting the gear to the sleeve, a brake mechanism and a single operating handle for actuating said clutch mechanism and said brake mechanism.

4. In combination in a lathe, a spindle, a sleeve loosely mounted on the spindle, means for operatively connecting the sleeve to the spindle, a driven gear rotatively mounted on the sleeve, a motor for actuating said gear, a driving gear actuated by the motor and continuously meshing with the driven gear, a clutch mechanism mounted on the sleeve, for operatively connecting the driven gear to the sleeve, a shiftable collar mounted on the sleeve, a stationary brake shoe with which said collar is adapted to contact, means mounted on the sleeve and actuated by the collar for actuating the clutch mechanism and an operating handle for actuating the collar.

5. In combination in a motor driven machine, a main spindle, a constantly driven motor for driving the spindle, a gear rotatively mounted with relation to the spindle, a continuously meshing train of gears actuated by the motor and including the rotatively mounted gear, a clutch mechanism for operatively connecting the rotatively mounted gear and the spindle, and a brake operatively connected with the clutch mechanism and adapted to stop the spindle when the clutch is disengaged and to release the spindle when the clutch is engaged.

RICHARD K. Le BLOND.
WILLIAM F. GROENE.

Witnesses:
 WALTER F. MURRAY,
 GRACE A. PUGH.